United States Patent [19]
Knox

[11] Patent Number: 5,189,328
[45] Date of Patent: Feb. 23, 1993

[54] LAMINATED MOTOR BEARING FOR ELECTRICAL SUBMERSIBLE PUMP

[75] Inventor: Dick L. Knox, Claremore, Okla.

[73] Assignee: Baker Hughes Incorporated, Houston, Tex.

[21] Appl. No.: 884,739

[22] Filed: May 15, 1992

[51] Int. Cl.[5] .......................... H02K 5/16; H02K 7/08
[52] U.S. Cl. ........................................ 310/90; 310/42; 310/87; 384/221
[58] Field of Search .................... 310/87, 90, 91, 114, 310/157, 42, 45; 277/136, 137; 384/221, 425, 428, 445, 906

[56] References Cited

U.S. PATENT DOCUMENTS

| | | | |
|---|---|---|---|
| 2,958,795 | 11/1960 | Luenberger | 310/87 |
| 3,254,248 | 5/1966 | Hagen | 310/86 |
| 3,484,633 | 12/1969 | Stecher | 310/87 |
| 4,040,690 | 8/1977 | Finney | 384/221 X |
| 4,435,661 | 3/1984 | Witten | 310/90 |
| 4,453,099 | 6/1984 | Flatt | 310/87 |
| 4,513,215 | 4/1985 | Del Serra | 310/90 |
| 4,521,708 | 6/1985 | Vandevier | 310/90 X |

Primary Examiner—Steven L. Stephan
Assistant Examiner—E. H. To
Attorney, Agent, or Firm—James E. Bradley

[57] ABSTRACT

A motor for a submersible well pump has rotor sections spaced apart from each other with bearings located between. The bearings support the shaft of the rotor within a stator. The bearings have a body made up of thin, circular metal nonmagnetic disks. The disks are stacked axially. A resilient member mounts to the bearing body for engaging the inner wall of the stator to prevent rotation of the bearing.

7 Claims, 1 Drawing Sheet

LAMINATED MOTOR BEARING FOR ELECTRICAL SUBMERSIBLE PUMP

BACKGROUND OF THE INVENTION

1. Field of the Invention

This invention relates in general to submersible pump motors, and in particular to a bearing which resists rotation. The bearing supports the shaft in the motor.

2. Description of the Prior Art

A submersible pump assembly of the type herein has a centrifugal pump driven by a submersible pump motor, which may include more than one motor in tandem. The motors may total when assembled up to sixty feet in length and be rated at several hundred horsepower. Each motor has a stator secured within a tubular housing. The stator is made up of thin disks, called laminations, that are magnetic and insulated from each other by coatings. Windings extend through the laminations of the stator.

A rotor secured to a shaft rotates within the stator. Because of the long length, the rotor is made up of a number of rotor sections. Each rotor section comprises a large number of flat metal disks, called laminations, that are secured by copper rods. The disks are insulated from each other by coatings. The rotor sections are spaced apart from each other, and a bearing assembly locates between each rotor section for maintaining the shaft in axial alignment. The rotor sections are keyed to the shaft for rotation with the shaft.

Each bearing assembly includes a bushing keyed to the shaft for rotation. A bearing body fits slidingly on the bushing and frictionally engages the inner wall of the stator at operating temperatures. This engagement prevents the bearing body from rotating and supports the shaft in alignment. One type of bearing body employs a resilient member on the exterior for engaging the stator.

The bearing body typically is a steel member that is magnetic. Unless provided for, the stator would interact with the bearing body to create eddy currents, which are not desirable. The electromagnetic field of the stator would try to rotate the bearing body, creating heat and power losses. In the prior art, to avoid magnetic interaction with the bearing body, the stator utilizes sections of brass laminations located adjacent each bearing. The brass, being nonmagnetic, reduces electromagnetic interaction with the bearing body. The remainder of the stator would be made up of steel laminations. However, the brass laminations are expensive and wear more quickly than the steel laminations. Plastic bearing bodies have been proposed, but plastic bearings have temperature limitations.

SUMMARY OF THE INVENTION

In this invention, the bearing body is made up of a stack of disks or laminations. The laminations are preferably of a non-magnetic material such as a stainless steel. The disks may carry a resilient member on the exterior for engaging the inner diameter of the stator. The stator may be made up entirely of steel laminations.

DETAILED DESCRIPTION OF THE INVENTION

Figure 1:
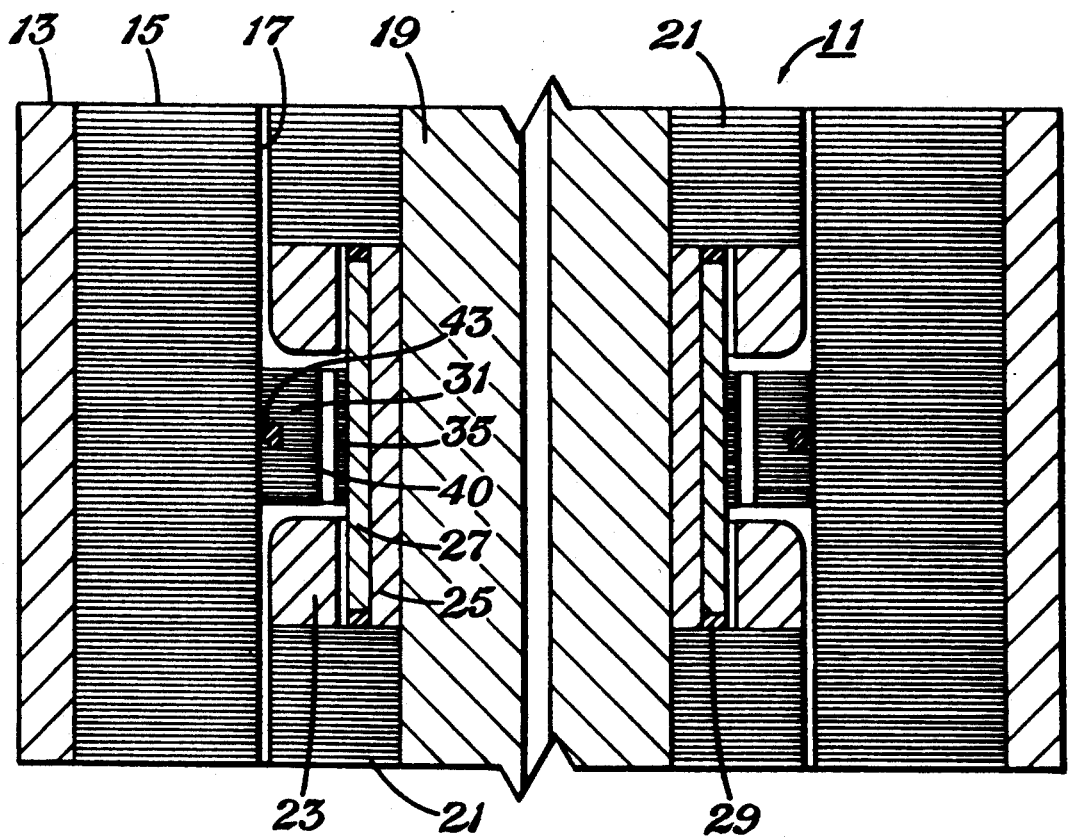
FIG. 1 is a partial cross sectional view of a motor having a bearing assembly constructed in accordance with this invention.

Referring to FIG. 1, motor 11 includes a cylindrical housing 13. A stator 15 is rigidly mounted within housing 13. Stator 15 is made up of a large number of flat disks, called laminations, having slots through which wires (not shown) are wound in a conventional manner. All of the disks of stator 15 are of magnetic steel. The disks of stator 15 may be insulated from each other by coatings in a conventional manner. Stator 15 has an inner diameter or wall 17 that is of uniform constant diameter.

A shaft 19 carries a rotor 21, which rotates within the inner wall 17 of stator 15. The rotor 21 is made up of a large number of metallic disks or laminations. The disks are magnetic and insulated from each other by coatings. The laminations of rotor 21 are divided into identical sections, each section being approximately 15 inches in length. A portion of two sections of rotor 21 are shown. Each section of rotor 21 terminates in an end ring 23. Copper rods (not shown) connect opposite end rings 23. The ends of the copper rods are brazed or mechanically welded to the end rings 23 to hold the laminations in each section of rotor 21 together.

Each section of rotor 21 is secured by a key (not shown) to shaft 19 for rotation therewith. The sections of rotor 21 are not individually axially locked to shaft 19. However, the lowermost section of rotor 21 at the end of shaft 19 is axially locked to support the sections of rotor 21 with respect to shaft 19. Also, the uppermost section of rotor 21 will be axially locked to shaft 19.

A bearing assembly is located between each of the sections of rotor 21. The bearing assembly includes a bushing 25 that is secured to shaft 19 for rotation therewith by means of a key (not shown). Bushing 25 is preferably a bronze cylinder and is not axially locked to shaft 19. The upper edge or circular rim of bushing 25 contacts the lowermost lamination of the section of rotor 21 directly above. The lower edge of inner bushing 25 contacts the uppermost lamination of the section of rotor 21 directly below. Inner bushing 25 supports the weight of the sections of rotor 21 above and transmits any downward force on sections of rotor 21 located above to the next lower section of rotor 21.

A hub 27 locates within the inner bore of each end ring 23. Hub 27 slidingly receives the inner bushing 25. Hub 27 is cylindrical and has less length than inner bushing 25. Hub 27 is preferably of steel, and may be magnetic.

A thrust washer 29 is located around the outer diameter of inner bushing 25 and between the section of rotor 21 directly above and the upper edge of hub 27. A similar thrust washer 29 is located between the lower edge of hub 27 and the section of rotor 21 directly below. Thrust washers 29 are preferably of a nonmetallic material, such as a glass reinforced phenolic material. The distance from the lower side of the lower thrust washer 29 to the upper side of the upper thrust washer 29 is about 1/32 inch less than the height of bushing 25. This prevents the thrust washers 29 from bearing the weight of the sections of rotor 21 located above.

Figure 2:
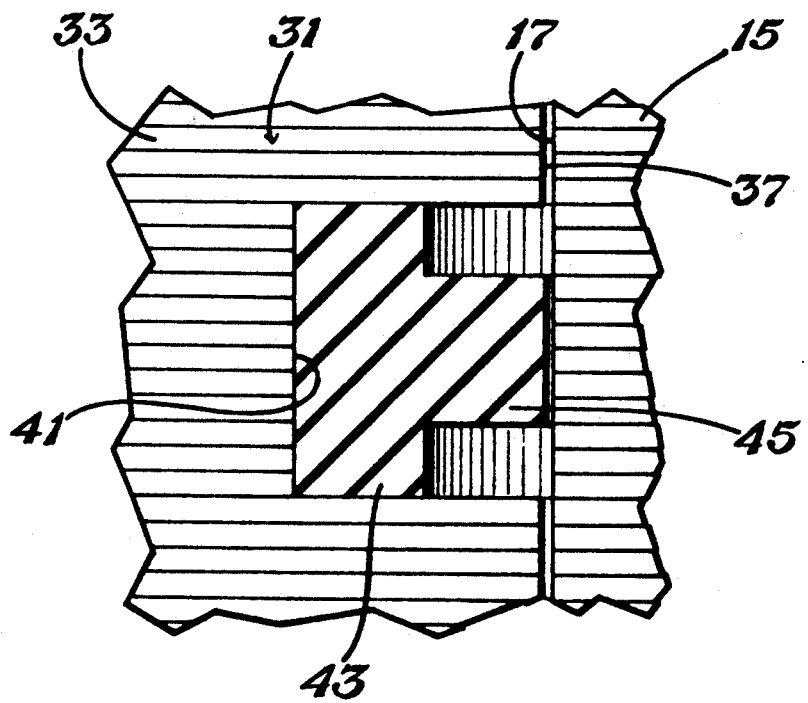
FIG. 2 is an enlarged sectional view of part of the bearing assembly of FIG. 1.

The bearing has a bearing body 31 that is bonded by an adhesive or press fitted to the hub 27. The body 31 is made up of a large number of stacked disks or laminations 33 (FIG. 2). Each disk 33 has a thickness that is approximately the same thickness as the laminations of the rotor 21 and of the stator 15. Similarly, each disk 33 is electrically insulated from adjacent disks by a coating of some type. Disks 33 may be bonded to each other or retained together by the engagement with hub 27. Each disk 33 is metal and is preferably substantially nonmagnetic, such as a stainless steel.

The inner diameter 35 of each disk 33 engages the hub 27. The outer diameter 37 of bearing body 31 is closely spaced to the inner wall 17 of stator 15. Outer diameter 37 is spaced from the inner wall 17 of stator 15 by a clearance of about 0.003 to 0.005 inch on the diameter. A plurality of passages 40 extend axially through the body 31 for communicating oil contained within the housing 13.

The outer diameter 37 has a recess 41 formed in it that is annular and located about midpoint between the upper and lower sides of bearing body 31. Recess 41 is formed by making the outer diameters of the disks 33 in a midportion of bearing body 31 less than the outer diameters of the disks 33 of the upper and lower portions of bearing body 31.

The bearing body 31 carries a resilient means for frictionally engaging the stator inner wall 17. The resilient means may be an elastomeric ring 43. Ring 43 is described in more detail in U.S. Pat. No. 4,513,215, Apr. 23, 1985, David I. Del Serra. Ring 43 locates within recess 41. Ring 43 has a rectangular shaped central band 45 that protrudes outward. The elastomeric material of ring 43 is of a type that will swell under prolonged contact with the type of oil that will be contained within the stator wall 17.

Initially, there will be a clearance between the outer periphery of central band 45 and stator inner wall 17. Preferably the outer periphery of central band 45 will be initially recessed about 0.002 to 0.003 inch from the outer diameter 37 of bearing body 31. This allows the rotor 21 to be easily inserted into the housing 13. After 1½ to 2 hours of operation, the swelling of ring 43 will cause the clearance to close up. The resilient means may be of other types, such as locator pins illustrated in U.S. Pat. No. 4,521,708, Jun. 4, 1985, Joseph E. Vandevier.

In operation, current will be supplied to the windings of stator 15. The current induces rotation of the rotor 21. The rotating shaft 19 will drive the pump section. After about 1½ to 2 hours of operation, the oil and the heat will cause the ring 43 to expand and firmly engage the stator inner wall 17. The engagement of ring 43 prevents the bearing body 31 from spinning with the shaft 19.

The current passing through stator 15 creates a rotating magnetic field. The disks 33 diminish the effect of any induced currents in the bearing body 31 by increasing the resistance of the bearing body. Furthermore, being substantially nonmagnetic, the bearing body 31 will not experience any significant eddy currents from the magnetic field of stator 15.

The invention has significant advantages. The laminated bearing body reduces the effect of eddy currents and reduces torque imposed by the magnetic field of the stator. The construction is simple and effective.

While the invention has been shown in only one of its forms, it should be apparent to those skilled in the art that it is not so limited, but is susceptible to various changes without departing from the scope of the invention.

I claim:

1. In a motor for a submersible well pump, the motor being of the type having a cylindrical housing, a stator stationarily mounted in the housing for producing a rotating magnetic field when supplied with electrical power, the stator having an inner wall providing an axial passage therethrough, a rotor mounted to a shaft and located in the passage for rotating in response to the rotating magnetic field when the stator is supplied with electrical power, the rotor having plurality of sections, each section having ends spaced axially apart from each other, providing annular spaces for bearing assemblies to radially support the shaft, each bearing assembly comprising in combination:

an annular bearing body having an inner diameter through which the shaft extends and an outer diameter closely spaced to the inner wall of the stator, the bearing body having means for reducing induced currents in the bearing body from the rotating magnetic field produced by the stator comprising a plurality of stacked metal disks which increase electrical resistance of the bearing body to diminish the effect of any of the induced currents.

2. The motor according to claim 1 wherein the stator comprises a plurality of metal stator disks, wherein the rotor comprises a plurality of metal rotor disks, each having a thickness substantially the same as the stator disks, and wherein the disks of the bearing body have substantially the same thickness as the thicknesses of the stator disks and rotor disks.

3. The motor according to claim 1 wherein the disks of the bearing body are nonmagnetic.

4. In a motor for a submersible well pump, the motor being of the type having a cylindrical housing, a stator stationarily mounted in the housing for producing a rotating magnetic field when supplied with electrical power, the stator having an inner wall providing an axial passage therethrough, a rotor mounted to a shaft and located in the passage for rotating in response to the rotating magnetic field when the stator is supplied with electrical power, the rotor having plurality of sections, each section having ends spaced axially apart from each other, providing annular spaces for bearing assemblies to radially support the shaft, each bearing assembly comprising in combination:

a plurality of thin circular metal disks stacked axially together in contact with each other to define a bearing body having an inner diameter and an outer diameter, the disks increasing electrical resistance of the bearing body to diminish any induced currents from the rotating magnetic field;

a hub extending through and fixed to the inner diameter of the bearing body, the shaft extending through the hub;

a recess formed in the outer diameter of the bearing body; and resilient means in the recess of the bearing body for engaging the inner wall of the stator to prevent rotation of the bearing body and stabilize the shaft.

5. The motor according to claim 4 wherein the disks are nonmagnetic.

6. The motor according to claim 4 wherein each of the disks has an electrical insulation coating.

7. In a motor for a submersible well pump, the motor being of the type having a cylindrical housing, a stator stationarily mounted in the housing for producing a rotating magnetic field, the stator having an inner wall providing an axial passage therethrough, a rotor mounted to a shaft and located in the passage for rotating in response to the rotating magnetic field when the stator is supplied with electrical power, the rotor having plurality of sections, each section having ends spaced axially apart from each other, providing annular spaces for bearing assemblies to radially support the shaft, each bearing assembly comprising in combination:

- a bushing mounted to the shaft in each annular space for rotation with the shaft;
- a hub mounted slidably to the bushing to allow rotation of the bushing relative to the hub;
- a plurality of thin circular metal nonmagnetic disks stacked axially together in contact with each other to define a bearing body with a lower portion, a central portion, and an upper portion, each of the disks having an inner diameter and an outer diameter, the inner diameters of the disks being secured to the hub to prevent rotation of the bearing body relative to the hub, the outer diameters of the disks of the central portion being smaller than the outer diameters of the disks of the lower portion and upper portion, defining an annular recess, the outer diameters of the lower portion and upper portion being closely spaced to the inner wall of the stator, the disks increasing electrical resistance of the bearing body to diminish any induced currents from the rotating magnetic field;
- the bushing engaging ends of adjacent sections of the rotor and having an axial length greater than the axial lengths of the bearing body and the hub to avoid any axial load on the bearing body due to the weight of the sections of the rotor above the bearing assembly; and
- a resilient member in the recess of the bearing body for engaging the inner wall of the stator to prevent rotation of the bearing body and stabilize the shaft.

* * * * *